(12) United States Patent
Ramle et al.

(10) Patent No.: US 8,300,602 B2
(45) Date of Patent: Oct. 30, 2012

(54) ARRANGEMENT AND METHOD RELATING TO DIRECT TUNNELLING IN CONNECTION WITH HANDOVER IN A COMMUNICATIONS NETWORK

(75) Inventors: Peter Ramle, Mölnlycke (SE); Hans-Olof Sundell, Öckerö (SE); Lasse Olsson, Stenungsund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 565 days.

(21) Appl. No.: 12/520,467

(22) PCT Filed: Dec. 21, 2006

(86) PCT No.: PCT/SE2006/050616
§ 371 (c)(1),
(2), (4) Date: Jun. 19, 2009

(87) PCT Pub. No.: WO2008/076030
PCT Pub. Date: Jun. 26, 2008

(65) Prior Publication Data
US 2010/0061340 A1    Mar. 11, 2010

(51) Int. Cl.
*H04W 4/00* (2009.01)
*H04W 36/00* (2009.01)
(52) U.S. Cl. ......................... 370/331; 455/438
(58) Field of Classification Search .......... None
See application file for complete search history.

(56) References Cited

U.S. PATENT DOCUMENTS

| 7,649,837 | B1* | 1/2010 | Puuskari | 370/225 |
| 2002/0080819 | A1* | 6/2002 | Tsao | 370/469 |
| 2006/0179474 | A1* | 8/2006 | Bichot | 726/3 |
| 2006/0256749 | A1* | 11/2006 | Rexhepi et al. | 370/329 |
| 2006/0262778 | A1* | 11/2006 | Haumont et al. | 370/356 |
| 2006/0274688 | A1* | 12/2006 | Maxwell et al. | 370/328 |
| 2007/0127444 | A1* | 6/2007 | Gras et al. | 370/356 |
| 2007/0213057 | A1* | 9/2007 | Shaheen | 455/436 |
| 2007/0243872 | A1* | 10/2007 | Gallagher et al. | 455/436 |
| 2008/0304450 | A1* | 12/2008 | Rexhepi et al. | 370/331 |

* cited by examiner

*Primary Examiner* — Andrew Chriss

(57) ABSTRACT

The present invention relates to a packet data support node ($20_1$) with a serving functionality and supporting over at least a first radio access network. It comprises mobility handling means and session handling means. It further comprises detecting means, in communication with said mobility handling means and with said session handling means, which are adapted to detect or establish initiation of a handover of a mobile station from the first or source radio access network. The session handling means are adapted to keep information about support for a direct tunneling functionality between the gateway packet data support node and the first radio access network. The detecting means are adapted to, upon detecting initiation of an HO from a first mode supporting direct tunneling (10) activate initiation of a reset of the direct tunnel and set up of two tunnel tunnels (10A, 10B) replacing said direct tunnel (10), each having a respective end point in the packet data support node.

10 Claims, 9 Drawing Sheets

ARRANGEMENT AND METHOD RELATING TO DIRECT TUNNELLING IN CONNECTION WITH HANDOVER IN A COMMUNICATIONS NETWORK

TECHNICAL FIELD

The present invention relates to handovers in communications networks supporting communication of packet data. It particularly relates to a packet data support core network node and to a method relating to a handover of a mobile user station.

BACKGROUND

Packet switched (PS) handover procedures are used to handover an MS (Mobile Station) with one or more packet flows from a source cell to a target cell. The source and target cells can be located within the same BSS (Base Station System), then the handover is called an Intra-BSS HO, in different BSSs within the same SGSN (Serving GPRS Support Node), then called an Inter-SGSN HO) or belong to different SGSNs (Inter-SGSN HO), or in different systems implementing different radio access technologies, called Inter-RAT (Radio Access Type)/mode HO (Intra-SGSN as well as Inter-SGSN).

Common for all handover procedures is that they comprise a PS handover preparation phase and a PS handover execution phase. Generally the PS handover preparation phase comprises the steps of making a decision in the source radio access network to request a PS (Packet Switch) handover for an MS and sending a request to the SGSN with which it was connected (old SGSN in the case of an Inter-SGSN HO), for an Inter-SGSN HO a request from the old SGSN to the new SGSN, to reserve resources in the target network nodes before ordering the MS to move to the target cell involving different procedures depending on the type of the HO. When the handover preparation phase has been successfully completed, the PS handover execution phase follows. It among other things comprises copying and forwarding packets from the old SGSN to the relevant source radio access network node and to the new, target, radio access network node. In case of an Inter-SGSN HO at the end of the handover procedure, user plane addresses are updated so that the SGSN will start receive packets from GGSN.

PS handover procedures of different types are discussed in 3GPP TS 43.129 v.6.9.0 (2006-09). Of particular concern are here IRAT PS handover procedures as referred to above which may be more complicated since they consist of handovers from one radio access technology to another.

3GPP TR 23.873 v.4.0.0 suggests a so called one tunnel approach which separates transport and control functionality of an SGSN. Suggested are a so called SGSN controller (cSGSN) which performs all control functions of an SGSN and an enhanced GGSN (Gateway GPRS Support Node), called xGGSN, performing SGSN and GGSN transport functionality. It enables a direct GTP (GPRS Tunneling Protocol) tunnel between the radio access network and the xGGSN and this means that the SGSN is bypassed as far as user plane traffic is concerned within the PS domain. The one tunnel approach is however only applicable for UTRAN/GERAN Iu mode and hence not for the GERAN Gb interface. When the so called direct or one tunnel approach is implemented, the SGSN provides the RAN (Radio Access Network) with the TEID (Tunnel Endpoint Identifier) and user plane address of the GGSN, and GGSN with the TEID and user plane address of the RAN.

The one tunnel concept has not taken the IRAT PS handover procedures as specified in 3GPP TS 43.129 into consideration. This means that if the one tunnel concept is used it may lead to very complex signalling since the downlink payload has to be routed through the source SGSN according to 3GPP TS 43.129.

3GPP TR 23.809 suggests two alternative solutions to this problem. According to one of the solutions, there is no impact on GGSN. For a PS Intra-SGSN handover from GERAN A/Gb mode to GERAN/UTRAN Iu mode, since the one tunnel approach cannot be used in GERAN A/Gb mode, two tunnels are always used in the SGSN which means that SGSN can duplicate and relay downlink data. For an Intra-SGSN PS handover from GERAN/UTRAN Iu mode to GERAN A/Gb mode, packets received by the source RNC (Radio Network Controller) are forwarded to the target BSS (Base Station Subsystem) via the SGSN. At the end of the handover procedure, user plane addresses are updated so that the SGSN will start receive packets from GGSN.

For an Inter-SGSN PS handover from UTRAN/GERAN Iu mode to GERAN A/Gb mode, downlink packets received by the source RNC are forwarded via the old and the new SGSN:s to the target BSS. At the end of the handover procedure, user plane addresses are updated so that the SGSN will start receive packets from GGSN. Thus, in the first case, in order to enable bicasting, the source RNC will copy and forward packets to SGSN where they can be forwarded to target BSS, which will forward packets to the MS to assure that there will be no or little packet loss during the handover. This means that the SGSN will receive packets on the uplink, which packets actually form part of the downlink packet flow. This may produce a complicated situation in addition to unnecessary sending of payload packets as well as control signalling. In the latter case, for an Inter-SGSN PS handover, in order to enable bicast, RNC has to copy and forward packets to the old SGSN which forwards them to the new SGSN for forwarding to the target BSS. In this case SGSN will receive uplink packets which actually form part of the downlink packet flow and a lot of unnecessary sending of payload packets and control signalling is produced.

According to the other solution, for an Inter-SGSN handover, after the handover preparation period, a new SGSN sends the new SGSN user plane tunnel information to the GGSN in an Update PDP context request message to establish the user plane between the new SGSN and GGSN. GGSN then stores both the SGSN tunnel information and source RNC/BSS tunnel information. After receiving a relocation command, the RNC forwards the downlink packets to the GGSN and the GGSN forwards them to the new SGSN. When the PS handover preparation phase is completed the new SGSN informs the GGSN that the RNC/BSS tunnel should be removed. This means that substantial signalling capacity over the Iu interface is needed since the source RNC has to be informed about the forwarding. This produces an unnecessary load on the SGSN control plane. Additionally the GGSN will have problems in keeping track of which packets that actually are uplink (UL) packets and which are downlink (DL) packets since both UL and DL packets are sent from the same RNC which leads to possible LI (Legal Intercept) and S-CDR (SGSN-Call Detail Records) mismatches and faults.

To summarize, for both solutions there will be an unnecessary signalling load as well as payload over the Iu interface and the core network. Furthermore it becomes difficult to distinguish between uplink and downlink payload packets.

SUMMARY

It is an object of the present invention to suggest a solution for handovers, particularly Inter-RAT/mode handovers, through which, while still keeping packet losses low, resources can be saved both as far as signalling resources as traffic resources are concerned.

Particularly it is an object of the invention to suggest a solution through which Inter-RAT/mode handovers from UTRAN/GERAN Iu mode to GERAN A/Gb mode, more generally from a mode supporting direct or one tunneling of user plane data between the radio access network and a gateway packet data support node to a mode not supporting such a functionality (or to a mode also supporting such a functionality), without producing unnecessary control signalling or user plane traffic load and without requiring complex solutions. Particularly it is an object of the invention to provide a solution through which an Inter-RAT mode handover can be provided from a mode supporting direct tunneling of payload packets to a mode, supporting direct tunneling or not, without introducing confusion about whether payload packets are uplink packets or downlink packets, i.e. a solution through which it becomes possible to distinguish between uplink and downlink payload packets. It is also an object to provide a solution through which reception of one and the same packet twice in a user equipment can be avoided or minimized. It is also an object to provide a solution which facilitates bicasting of packets during a PS handover execution phase.

Therefore a packet data support core network node, or shorter a packet data support node, with a serving functionality and supporting access over at least a first radio access network is provided, which further comprises mobility handling means and session handling means. According to the invention it is adapted to detect an intended or initiated handover of a mobile user station connected to the packet data support core network node via a first radio access network over an interface using direct tunneling of user plane data, bypassing the packet data support core network node, to a second radio access network (the same as the first, or another) using an interface for communication with the, or another, packet data support node and to, upon detection of such a handover initiation, initiate reset of the direct tunnel or replacement of said tunnel, particularly by two tunnels via the packet data support node.

The invention also provides a method relating to a handover of a mobile station or user equipment from a first, old or source, radio access network to a second, new or target, radio access network (which may be, in some embodiments the same as the first), which comprises the steps of; detecting or establishing, in a packet data support node handling the first, source, radio access node involved in the session of the mobile user station, if a request for initiation of a handover, for example a relocation request, relates to a handover from the first, source, radio access network in a mode that supports or uses a direct tunnel from an involved gateway packet data support node to the source, first radio access network node, i.e. bypassing the packet data support node, to a second, target, radio access network node connected to the same or a different packet data support node, if yes, activating initiation of a procedure for reset of the direct tunnel and set up of two tunnels replacing said direct tunnel with a respective end point in the said packet data support node.

The inventive concept is particularly implemented for PS handovers. The inventive concept is also applicable for ISRAU (Inter SGSN Routing Area Updates), with or without ISC (InterSystem Change), when performing a RAU where a direct tunnel has been implemented. Then it is advantageous since it permits forwarding to and buffering in the new SGSN of downlink packets.

It is a particular advantage of the invention that an Inter-RAT handover can be performed in an easy manner and without wasting signalling resources. It is also an advantage that an Inter-RAT handover can be provided/prepared without wasting user plane traffic resources. It is furthermore an advantage that an improved solution for performing an Inter-RAT handover is provided which is applicable and resource efficient irrespectively of whether the handover is done from systems or modes supporting the direct tunneling concept to systems or modes supporting the direct tunneling concept or not. It is also an advantage that a solution is provided through which it can be avoided that interfaces and nodes, for example source radio access network node, SGSN or GGSN, are unnecessarily loaded. It is also an advantage of the invention that an Inter-RAT handover procedure, particularly a preparation handover procedure, is provided which enables and facilitates separation of uplink and downlink payload packets. It is also an advantage of the invention that a solution for Inter-RAT handovers is provided which minimizes or reduces the risk that a mobile station user equipment receives one and the same packet more than once. It is also an advantage of the invention that a solution is provided through which the risk of packet loss or interruptions can be minimized without introducing complexity into the system.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1A:
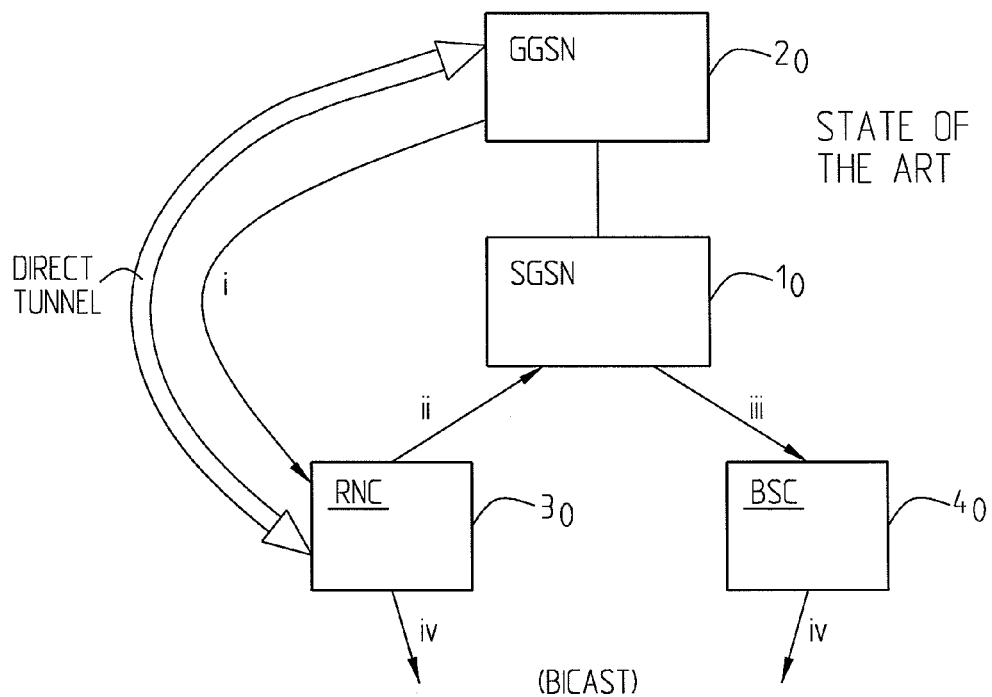
FIG. 1A is a block diagram schematically illustrating a state of the art solution for an IRAT Intra-SGSN handover.

In a particular embodiment of the present invention the detecting means are adapted to be in communication with said mobility handling means and with (or comprised in) said session handling means. Said mobility handling means are adapted to establish initiation of a handover of a mobile station or user equipment connected over the first, also called old or source, radio access network to the second, new (target), radio access network. Said session handling means are adapted to keep information about support for, or use of, a direct tunnel for user traffic, or payload at connection over the first radio access network. Said detecting means are adapted to, using information from the mobility handling means and the session handling means, upon detecting initiation of a handover of a mobile user station in a session for which direct tunneling of user plane traffic is implemented to activating initiation of a reset of the direct tunnel and set up of two tunnels replacing said tunnel, which two tunnels have a respective end point in the packet data support node.

The establishment of initiation of a handover may comprise detection or establishment of reception a request for relocation in the packet data support node.

In a particular embodiment the detecting means comprise or communicate with activation means, adapted to initiate said replacement of the direct tunnel by two tunnels. Even more particularly the detecting means or the activation means comprise, for said initiation, message generation means for generation and sending of a message to the gateway packet data support node involved in a mobile station or a user equipment session to be handed over. The message particularly includes or comprises identity information of the (first, old) packet data support node. In a preferable implementation, the message generation means are adapted to generate an update PDP context request message with user plane TEID (Tunnel Endpoint Identifier) and IP address of the packet data support node. In advantageous embodiments the packet data support node is enabled or adapted to bicast user plane traffic (payload) upon completed handover preparation. This is enabled in a simple manner through the replacement of the one tunnel by two tunnels, one from the gateway packet data support node to the first or old packet data support node, and one from the packet data support node (the first or old packet data support node) to the first (source) or old radio access network, particularly to a radio access node which may comprise an RNC (Radio Network Controller).

The inventive concept is applicable both for so called Intra-SGSN handovers and for Inter-SGSN handovers. Thus, the packet data support node is adapted to, upon detection of initiation of a handover to a target radio access network node controlled by another, new packet data support node, bicast downlink user plane traffic or payload to said new target packet data support node and to the old, first, radio access node. Alternatively, for an Intra-SGSN handover, it is adapted to, upon detection of initiation of a handover to a new, target radio access network node controlled by itself, bicast downlink user plane or payload traffic to said new, target radio access network node and to said old radio access network node.

Particularly the packet data support node comprises the functionality of an SGSN, (or a CGSN), particularly of a so called SGSN controller performing all control functions of an SGSN, in addition to the functions according to the inventive concept. The GGSN particularly comprises the function of a so called enhanced GGSN performing SGSN and GGSN transport functionality such that a direct GTP-U tunnel is enabled between the radio access network and the first GGSN.

The handover particularly is an IRAT PS handover. It may also be an ISRAU or an ISC (InterSystem Change).

The packet data support node particularly is adapted to detect a handover from Iu mode to Gb mode, for example from UTRAN/GERAN Iu-mode to GERAN A/Gb-mode, or from WCDMA (Wideband Code Division Multiplex Access) to GSM (Global System for Mobile communications), (or an ISRAU or an ISC).

The activation step of the inventive procedure particularly comprises; generation of a message requesting update of a communication resource; sending the message to the gateway packet data support node involved in the session.

The message particularly comprises an update PDP context request comprising user plane tunnel endpoint identification (TEID) and IP address of the packet data support node.

Particularly the method further comprises, in the initiation procedure, sending a PDP context response from the gateway packet data support node to the packet data support node.

Particularly, for an Inter-SGSN handover, the method may comprise the step of, upon reception of a PDP context response message; sending downlink user plane traffic packets by sending packets to the first, old (source) radio access network node and to the second, new packet data support node, enabling bicasting.

In another embodiment, for an Intra-SGSN handover, the method may comprise the step of, to enable bicasting, and upon reception of the PDP context response message; sending downlink user plane traffic packets to the first, source, radio access network node and to the second, target, radio access network node, hence providing bicasting in a simple manner, without unduly loading nodes and resources in general.

Particularly the first, or old, packet data support node comprises an SGSN or a CGSN functionality or a corresponding functionality of a relevant packet data support node.

Particularly the handover comprises an Inter-RAT/mode handover from UTRAN/GERAN Iu-mode to GERAN A/Gb-mode, for example from WCDMA to GSM. The first, source, radio access network node particularly comprises an RNC or a node with a similar functionality, and the second or target radio access network node comprises for example a BSC (Base Station Controller).

The (first and/or second) packet data support node may support dual access over different access networks. Alternatively the first and/or second packet data support node supports single access only.

FIG. 1A is a block diagram describing a state of the art solution as discussed in the background section for an Inter-RAT, Intra-SGSN handover. It is supposed that a direct tunnel is implemented between a GGSN $2_0$ and RNC $3_0$, i.e. SGSN $1_0$ is bypassed for payload traffic. To perform a handover of a mobile station from RNC $3_0$ to BSC $4_0$, packets received in RNC $3_0$ from GGSN $2_0$ (DL PL) (i.), will be copied and forwarded from RNC $3_0$ to SGSN $1_0$, (ii.), since there is no payload tunnel between the GGSN and SGSN. SGSN $1_0$ will then forward the packets to BSC $4_0$ (iii.). Bicasting can then be done during the beginning of the execution phase, as discussed above, from RNC $3_0$ and the BSC $4_0$ (iv.). As discussed above the SGSN $1_0$ will here receive downlink packets on the uplink.

Figure 1B:
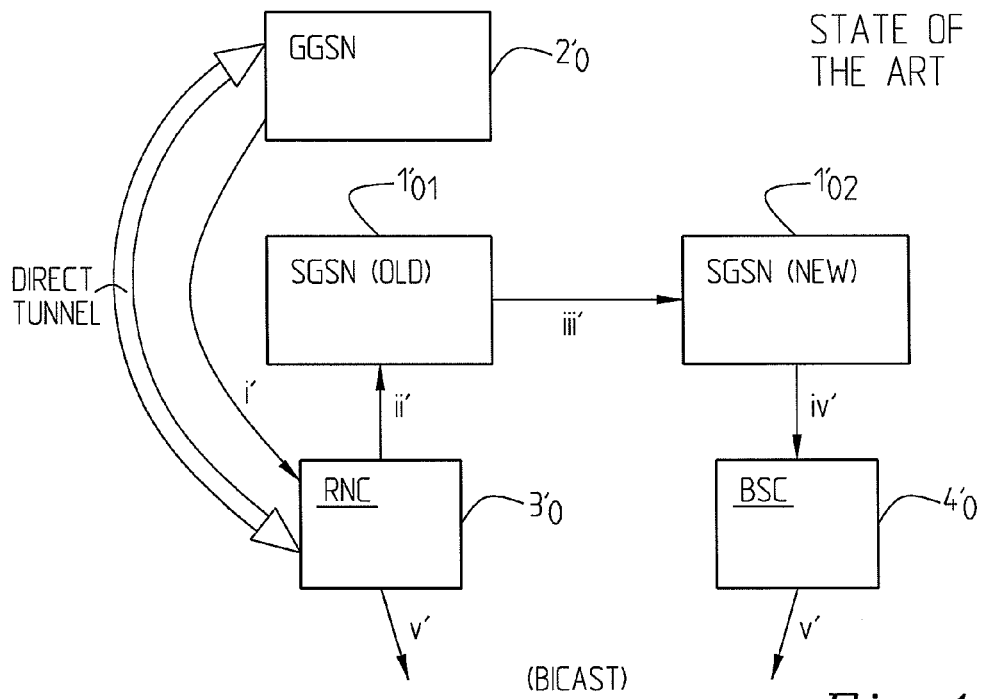
FIG. 1B shows a state of the art solution as in FIG. 1A but for an IRAT Inter-SGSN handover.

FIG. 1B is a state of the art block diagram describing a solution following the same principle as in FIG. 1A but for an Inter-SGSN handover. There is a direct tunnel between GGSN $2_0'$ and RNC $3_0'$, i.e. between the radio access network and a GGSN supporting the direct tunneling concept, and a HO is to be done to a radio access network in a mode for which the direct tunnel concept is not supported. In this case the downlink payload, sent from GGSN $2_0'$ to RNC $3_0'$ (i') is copied and forwarded to SGSN (old) $1_{O1'}$, (ii'), which forwards the user plane payload packets (iii) to new SGSN $1_{02}'$, which in turn forwards the packets, to BSC $4_0'$(ii'). The packets are then bicast from RNC $3_0'$ and BSC $4_0'$, (v', v'), i.e. the downlink payload is bicast at the beginning of the execution phase. The drawbacks associated with such solutions have been discussed in the background section; here it is merely intended to illustrate the functioning more clearly.

Figure 1C:
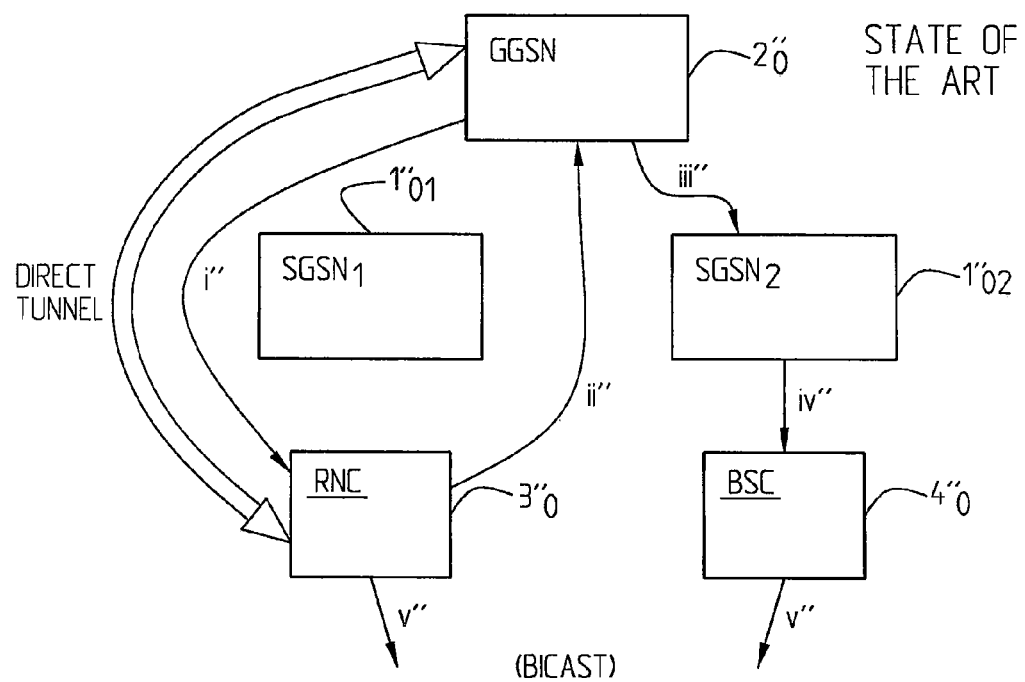
FIG. 1C shows a different state of the art solution for an IRAT Inter-SGSN handover.

According to another state of the art solution, illustrated in FIG. 1C, there is also a tunnel between GGSN $2_0''$ and RNC $3_{01}''$. It is intended to schematically illustrate a HO to another radio access network (node BSC $4_0''$) (for which the direct tunneling concept is not supported), here an Inter-SGSN handover. GGSN has stored both the SGSN tunnel information and the source, first RNC, tunnel information, i.e. the direct tunnel. Once the handover has been initiated, and RNC $3_0''$ has received a verification command, RNC forwards received downlink payload packets (N-PDU) (ii″) back to GGSN $2_0''$ (ii″), which forwards the payload packets, (iii″), to new or second $SGSN_2\ 1_{02}''$, which forwards them to target or new radio access network control node, here BSC $4_0''$ (iv″), which in turn sends the packets to the mobile station, (v″). This is also done by the RNC $3_0''$, (v″). The payload is bicast. The drawbacks with such a solution have also been discussed in the background section.

Figure 2:
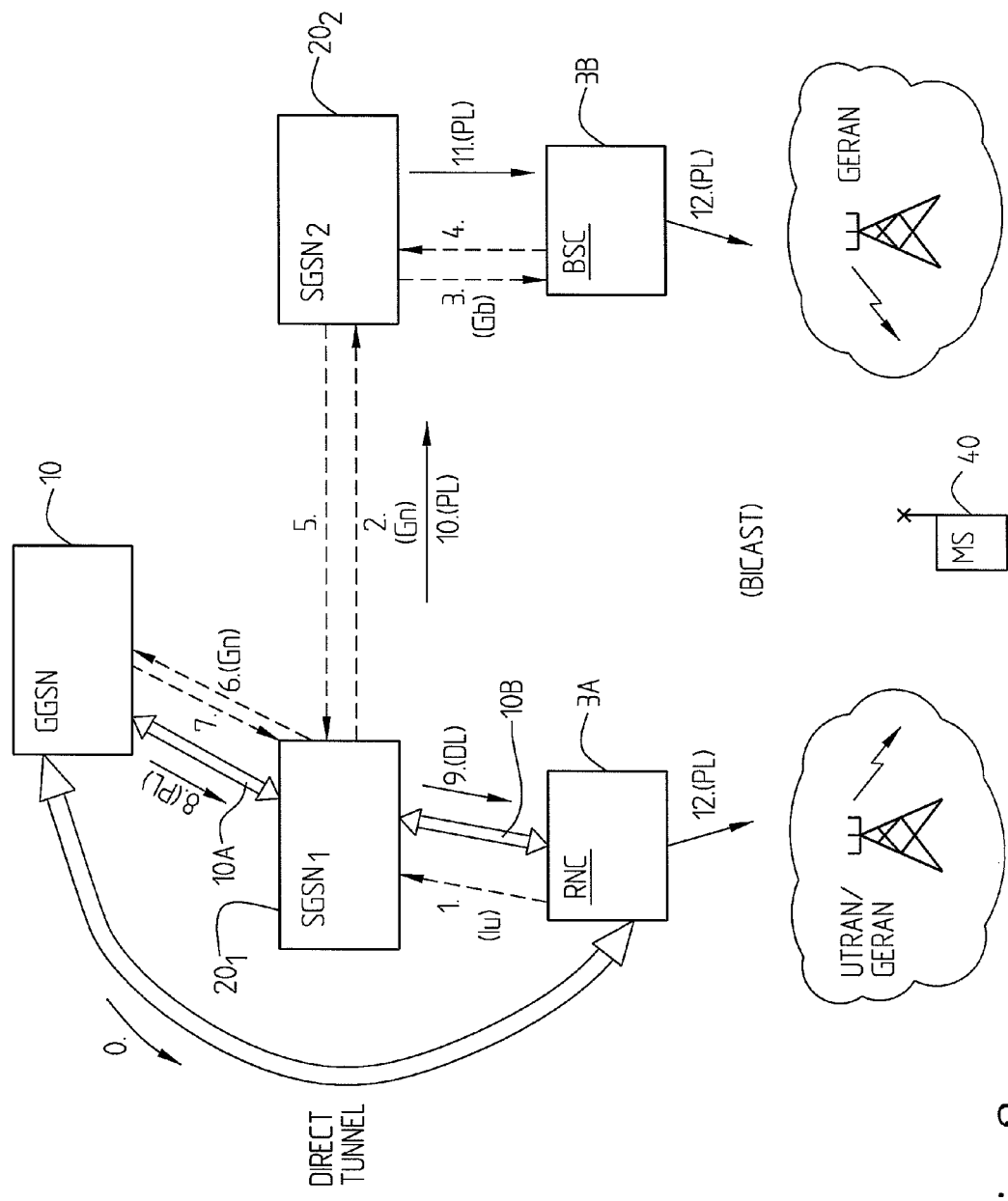
FIG. 2 is a block diagram schematically illustrating one implementation of the inventive concept for an Inter-RAT, Inter-SGSN handover.

FIG. 2 is a block diagram illustrating an implementation of the inventive concept for an IRAT, Inter-SGSN handover. The figure shows GGSN 10, a first or old SGSN 1 $20_1$, a second or new SGSN 2 $20_2$, a first or source radio access network node RNC 3A, connected to first or old SGSN 1, and a radio access network control node of the second radio access network, here BSC 3B, connected to SGSN 2 $20_2$. RNC 3A here is a radio access network node of an UTRAN/GERAN supporting direct tunneling over the Iu-interface between GGSN and RNC. The second radio access network with BSC 3B is a GERAN connected to SGSN 2 $20_2$ over the Gb-interface not supporting direct tunneling. It should be clear, however, that the inventive concept is applicable and equally attractive also if for connection to the second radio access network direct tunneling is supported, since the new direct tunnel will not be set up until at a later stage (after completed handover).

In FIG. 2 a direct, or one, tunnel is illustrated between GGSN 10 and RNC 3A which hence bypasses SGSN 1 $20_1$.

Before the handover has been initiated, the direct tunnel is used for tunneling payload from GGSN to RNC 3A, 0., (only DL is discussed herein). In the figure dashed lines illustrate control signalling whereas full lines indicate payload or user plane traffic. The illustrated control signalling corresponds to the signalling of an, according to the present invention, extended or modified handover preparation phase. When a decision has been made to handover an MS 40 from RNC 3A to BSC 3B of another radio access network, RNC 3A sends a message indicating that a relocation is required, (1.), over the Iu interface to SGSN 1 $20_1$, also called old or first SGSN. SGSN 1 $20_1$ forwards the relocation request to SGSN 2 $20_2$, (2.)(over the Gn interface) which sends a PS handover request (over the Gb interface) to the target radio access network node, here BSC 3B, (3.). After reservation of radio resources has been done in the target base station subsystem, according to conventional procedures, BSC 3B sends a handover request acknowledgement message to new or second SGSN 2 $20_2$, (4.). The communication between SGSN 2 $20_2$ and BSC 3B takes place over the Gb interface. SGSN 2 $20_2$ (new SGSN) sends a forward relocation response message, (5.), to first (old) SGSN 1 $20_1$. According to the invention old SGSN 1 $20_1$ then sends an update PDP context request to GGSN 10 over the Gn interface containing the user plane TEID and IP address of SGSN 1 $20_1$, (6.). GGSN 10 then responds with an update PDP context response, to SGSN 1 $20_1$, (7.). Then the direct tunnel between GGSN 10 and RNC 3A will be "reset" and replaced by a first tunnel 10A between GGSN 10 and SGSN 1 $20_1$ and a second tunnel 10B between SGSN 1 $20_1$ and RNC 3A. For bicasting purposes, in the beginning of the execution phase, downlink payload is sent from GGSN 10 to SGSN 1 $20_1$ over the tunnel 10A, (8.). The payload is then sent from SGSN 1 $20_1$ to RNC 3A over the tunnel 10B, (9.), and also from SGSN 1 $20_1$ to SGSN 2 $20_2$ over a tunnel (not illustrated) (10.), from where it is forwarded, (11.), to BSC 3B (since in GERAN Gb mode the direct tunnel is not implemented). The downlink payload is then bicast, (12.), from RNC 3A and BSC 3B respectively to MS 40.

The functioning is similar for an Intra-SGSN handover with the difference that SGSN 2, i.e. a second or new SGSN, is not involved.

Figure 3A:
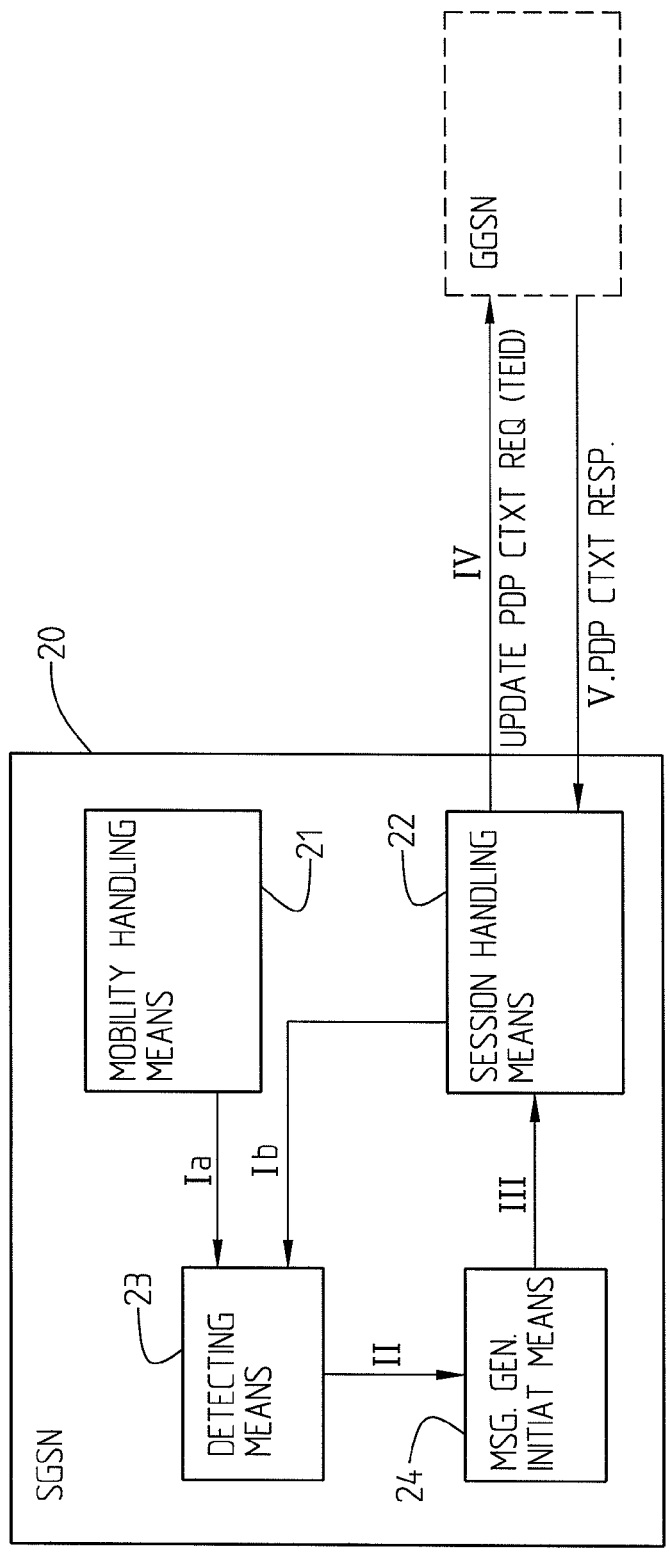
FIG. 3A is a simple block diagram illustrating a packet data support core network node, here an SGSN, in which the inventive concept is implemented.

FIG. 3A shows a very simplified block diagram of a first implementation of an SGSN 20 according to the inventive concept. Only those parts of an SGSN that are affected or relevant for the functioning of the inventive concept are illustrated for reasons of clarity, but it should be clear that in other aspects the SGSN or the packet data support node corresponds to any conventional packet data support node. In a conventional manner SGSN 20 comprises mobility handling means 21 and session handling means 22. They are not further described herein since they operate in a conventional manner. SGSN 20 is according to the present invention provided with a detecting functionality, here illustrated as implemented as detecting means 23 in communication with mobility handling means 21 from which they fetch or are provided with information that a PS handover has or will be initiated (Ia). The session handling means 22 brings information about whether, for a session of a mobile station, a direct tunnel from a GGSN (not shown) to the new access network is supported and used. This information is provided to or fetched by detecting means 23, (Ib). Using the information provided from mobility handling means 21 and session handling means 22, detecting means 23 can then establish that a handover is to be done from a radio access network connected over an interface or in a mode supporting a direct tunneling concept, to a radio access network connected over an interface, or in a mode (supporting the direct tunneling concept or not). SGSN 20 then activates a message generation initiation means 24, (II) which provides for generation of a message comprising the user plane tunnel endpoint identifier of SGSN 20 (III). In a conventional manner an update PDP context may be generated, and sent to GGSN (IV), which returns an update PDP context response to SGSN 20, (V).

Figure 3B:
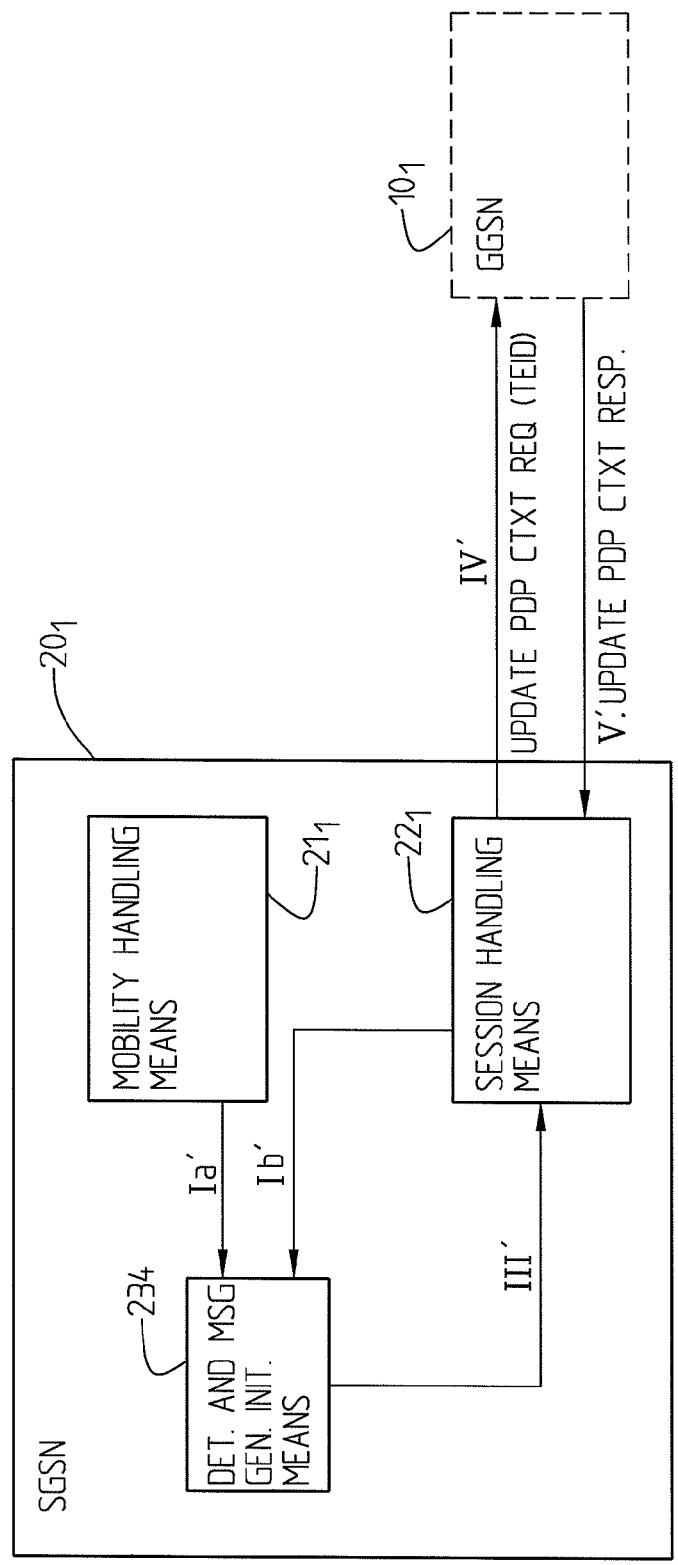
FIG. 3B is a simple block diagram of an SGSN according to another embodiment of the present invention.

FIG. 3B is a figure of an SGSN $20_1$ similar to FIG. 3A with the difference that the detecting means 23 and the message generation initiation means 24 are provided by means of a common detection and message generation initiating means 234 which, as above, using information from mobility handling means $21_1$ and session handling means $22_1$, (Ia', Ib') initiates generation of an update PDP context message with SGSN user plane TEID and IP address. The update PDP context request message with TEID, IP address is sent (IV') to GGSN $10_1$ which responds with an update PDP context response (V'). It should be clear that the functionality described above as far as provisioning of information about an intended handover from a radio access network in a mode supporting or using direct tunneling to another radio access network (e.g. connected in a mode not supporting direct tunneling) for initiating the generation of an update PDP context message can be done in many different ways, FIGS. 3A, 3B only exemplifying two specific embodiments.

The detecting and/or message generation initiation means can also be provided in, or as a functionality of, the session handling means.

Figure 4:
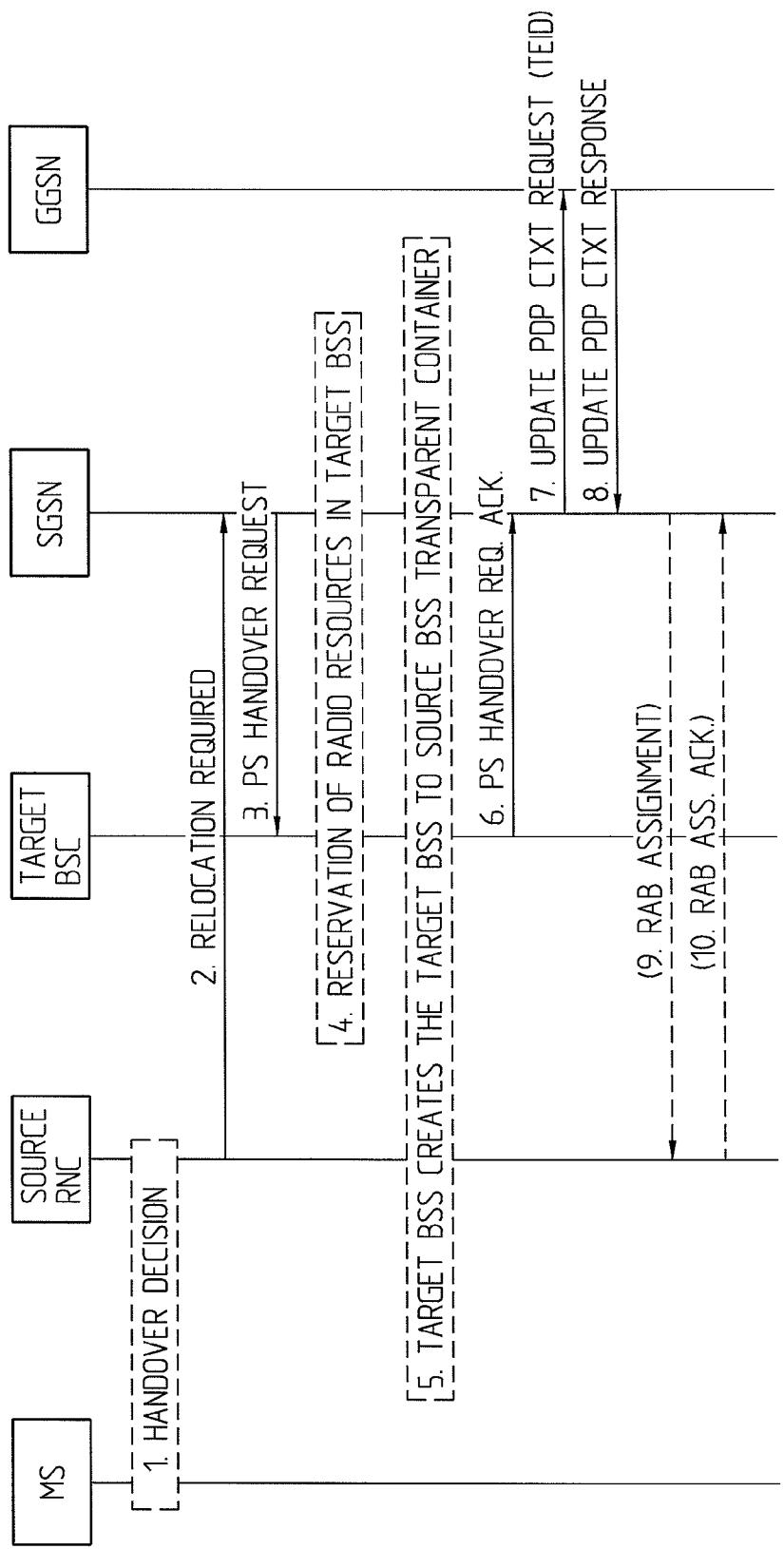
FIG. 4 is a sequence diagram illustrating the procedure for an IRAT Intra-SGSN handover according to the present invention.

FIG. 4 is a sequence diagram illustrating the inventive procedure for an Inter RAT, Intra-SGSN PS handover of an MS. It is supposed that a handover decision is made to handover MS from a source RNC to a target BSC, i.e. from UTRAN/GERAN Iu-mode to GERAN A/Gb-mode, 1. Uplink and downlink user data flows via a direct tunnel between GGSN and source RNC (GTP-U-tunnel). RNC then sends a relocation required message to SGSN, 2. It comprises among other things a target ID containing the identity of the MS target position. SGSN determines from the target position identifier that the type of handover is an Inter-RAT/mode handover and sends a PS handover request to target BSC, 3. In a conventional manner a reservation of radio resources is done in the target BSS (BSC), 4, and target BSS (BSC) creates a target BSS to source BSS transparent container, also in a conventional manner, 5. Target BSC then sends a PS handover request and acknowledge message to SGSN, 6. As discussed above, for example with reference to FIGS. 3A, 3B, it is established in or by SGSN if it is a handover from a mode having used a direct tunnel to GGSN. At any time subsequent to establishing that a HO is to be initiated, or has been initiated, e.g. at reception of a relocation request message, an update PDP context request is generated containing information about the user plane TEID of the SGSN which then is sent to GGSN, 7. GGSN responds to SGSN with an update PDP context response. The SGSN may in some embodiments need to update the source radio access node with SGSN user plane TEID and IP address (9.,10.), (indicated with a dashed line, since it is not always required). Then, for downlink user plane traffic bicasting can be implemented while ensuring that the downlink payload will be passed through the SGSN. This provides a simple way for bicasting DL PL packets over Gn.

Figure 5:
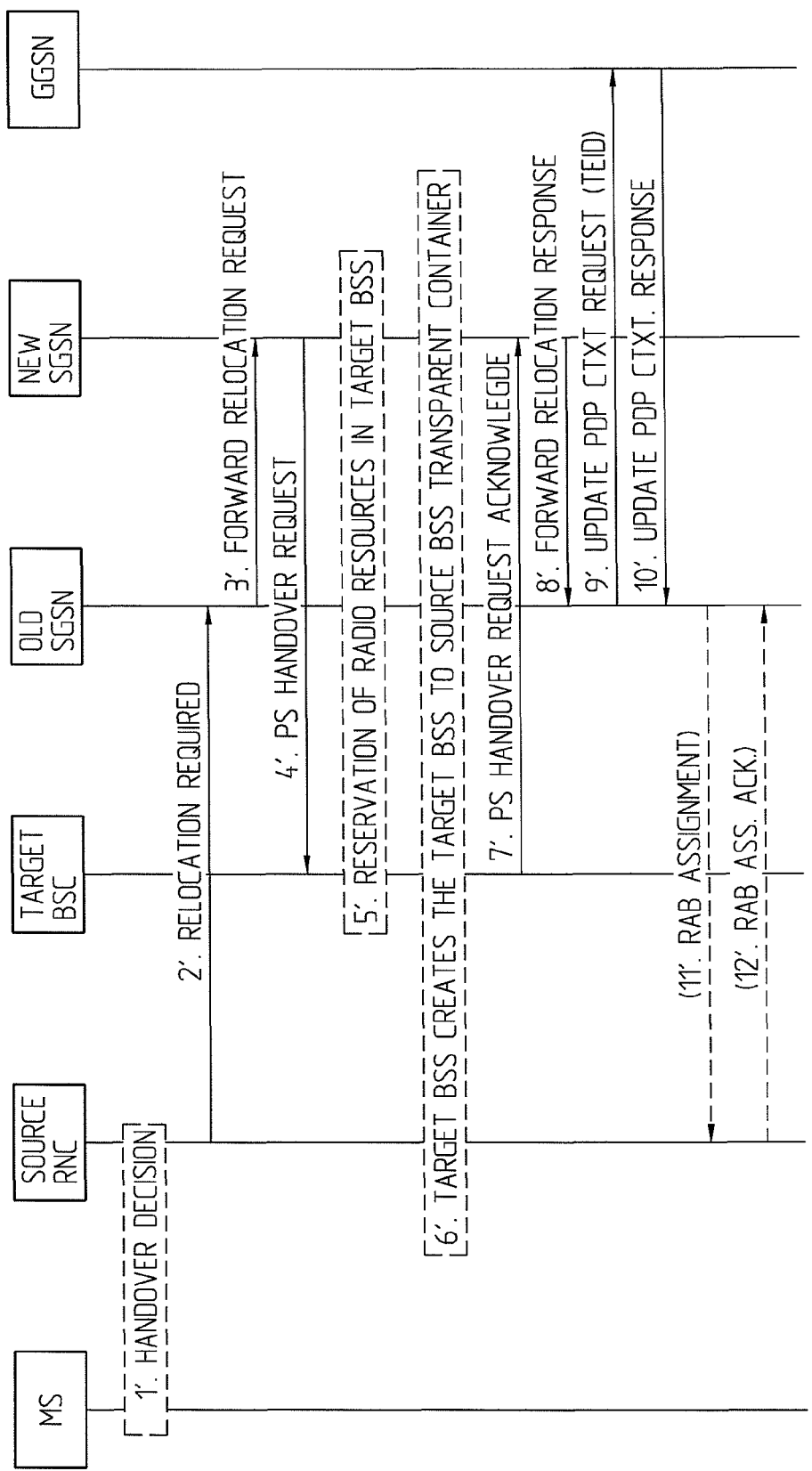
FIG. 5 is a sequence diagram illustrating an IRAT Inter-SGSN handover according to the present invention.

FIG. 5 shows a sequence diagram similar to that of FIG. 4 but for an Inter-RAT, Inter-SGSN PS handover. Based on measurement results and knowledge of the RAN topology, the source RNC decides to initiate an Inter RAT/mode PS handover towards GERAN A/Gb mode. At this point both uplink and downlink user data flows via the direct tunnel between source RNC and GGSN, 1'. Source RNC sends a relocation required message to the old SGSN with a target ID containing the identity of the target cell, 2'. The old SGSN determines from the target cell identifier that the type of handover is an Inter-RAT/mode handover and, since it is an Inter-SGSN PS handover, initiates a PS handover resource relocation procedure and sends a forward relocation request with among others IMSI (International Mobile Subscriber Identity), tunnel endpoint identifier control plane, PDP contexts, source BSS to target BSS transparent container in the BSS container etc. in a conventional message to the new SGSN, 3'. Also in a conventional manner, the new SGSN generates a PS HO message as for example described in 3GPP TS 43.129 v.6.9.0, section 5.3.2.1, sends a PS handover request to target BSC, 4'. Target BSS then creates the target BSS to source BSS transparent container, also in a conventional manner, 6'. Target BSS sends a PS handover request acknowledge message to the new SGSN, 7', and new SGSN sends a forward relocation response 8' to old SGSN. When the one tunnel or direct tunnel concept is implemented in the old SGSN, then the GGSN should be updated with the old SGSN user plane TEID and IP address as discussed with reference to FIGS. 3A, 3B. An update PDP context request message is therefore generated and sent to GGSN, 9' which then returns an update PDP context response 10'. The SGSN may in some embodiments need to update the source radio access node with SGSN user plane TEID and IP address (11'.,12'.), (indicated with a dashed line, since it is not always required). After that the old SGSN decides to proceed with the handover and the preparation phase is completed on which the execution phase will follow. It is ensured that the downlink payload will pass through the old SGSN which makes it possible to in a simply way bicast the packets over Gn.

It should be clear that steps 9.,10. (FIG. 4) and 11'.,12'. (FIG. 5) are not always needed, depending on implementation of e.g. RNC. In addition thereto, these steps are never needed for ISRAU:s. Conceptually, the procedural steps for an Inter-RAT, Intra-SGSN HO will be described with reference to the flow diagram of FIG. 6. In a first or old SGSN it is established if initiation of a handover preparation is detected, 100. Then, and if detected, it is established if the first or old SGSN and first radio access network connection mode or interface supports, or rather uses, a direct tunnel communication for the MS in question, 101. If not, the handover preparation phase is completed in a conventional manner and it is proceeded with a handover execution procedure, 101A. If however the direct tunneling concept is implemented, e.g. if it is established that it is an Iu-mode to Gb/A-mode handover, then generation of an update PDP context request is triggered which shall include the user plane TEID and IP address of the first or old SGSN, 102. The update PDP context request with TEID, IP address is sent to GGSN, 103, and an update PDP context response from GGSN is received in GGSN, 104, (possibly with a RAB update as discussed with reference to FIG. 4) which is the end of the preparation phase. Then can be proceeded with the execution phase and the SGSN TEID, IP address will be used for tunneling downlink payload packets from GGSN to SGSN in a first tunnel and from SGSN to the first or old radio access network node in a second tunnel. Hence downlink payload packets can be bicast in an optimized manner in the first part of the execution phase.

Figure 6:
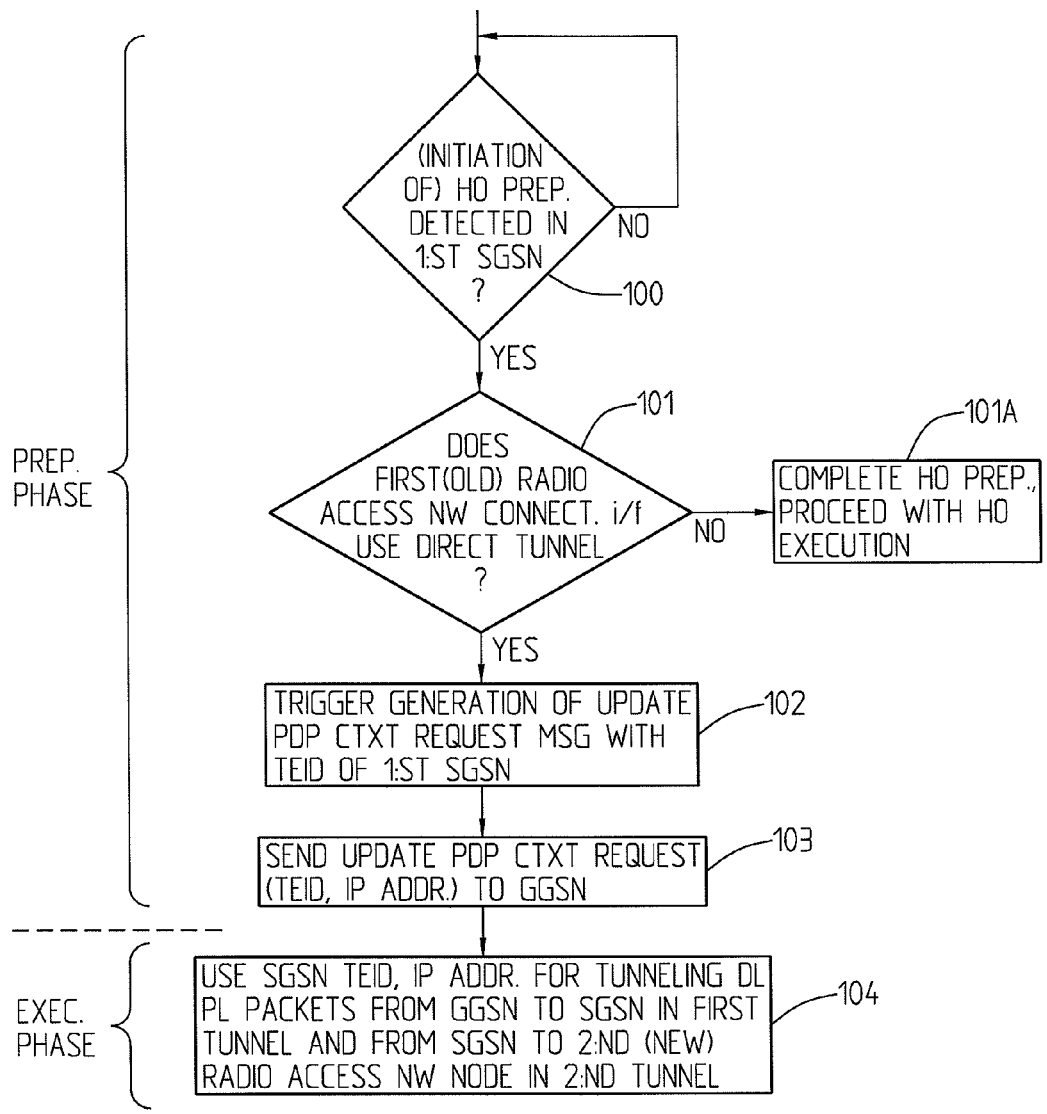
FIG. 6 is a flow diagram describing an IRAT Intra-SGSN handover.
Figure 7:
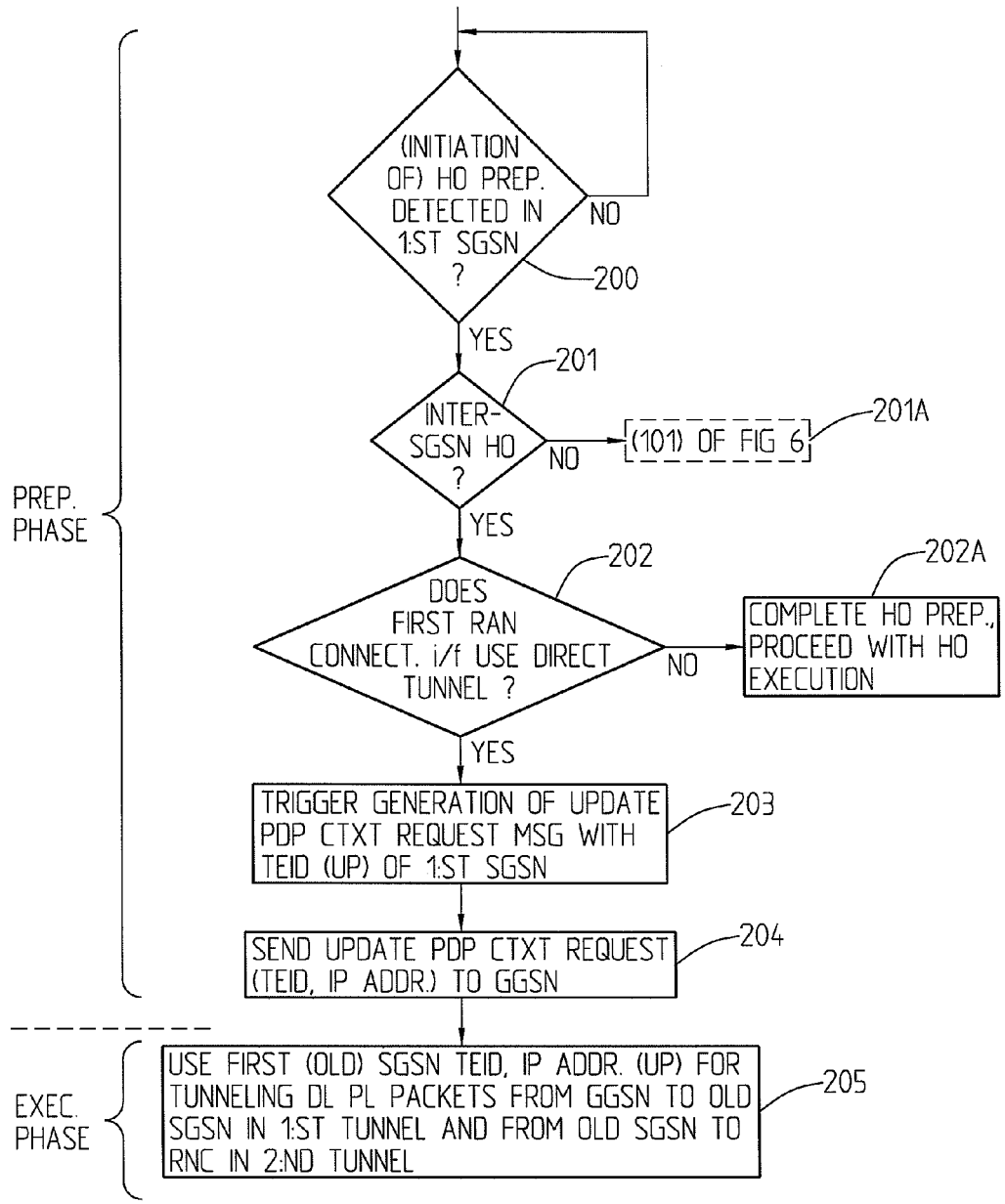
FIG. 7 is a schematical flow diagram describing an IRAT Inter-SGSN handover according to the present invention.

FIG. 7 is a flow diagram similar to that of FIG. 6 for an Inter-RAT, Inter-SGSN handover. Thus, it is established that if initiation of a handover preparation in the first or old SGSN has been detected, 200. If yes, it is established if it is an Inter-SGSN handover, 201. It should be clear that the intention of this flow diagram is to describe the steps in a clear and fundamental manner. If it is not an Inter-SGSN handover, 201A, it is proceeded with 101 of FIG. 6. If it is an Inter-SGSN handover, it is established if the first or old SGSN and RAN node supports or rather uses direct tunneling to GGSN, 202. If not, the handover preparation phase is completed and it is proceeded with a handover execution phase in a conventional manner, 202A. If yes, generation of an update PDP context request message with SGSN TEID, IP address (user plane) is triggered in first SGSN, 203, and the generated update PDP context request is sent to GGSN, 204, which provides a response and sends it to the first or old SGSN, 205. With reference to FIG. 6, this is actually the end of the handover preparation procedure after which it is proceeded with the execution phase.

The first or old SGSN TEID, IP address (UP) are used to enable for tunneling of downlink packets from GGSN to old SGSN in a first tunnel, and from old SGSN to RNC in a second tunnel. (Possibly a RAB update is sent as discussed above.)

The present invention is particularly advantageous for PS handovers, but also for e.g. Inter-SGSN RAU (ISRAU) procedures e.g. from Utran to Geran or from Geran Iu-mode to Geran Gb-mode, ISRAU procedures are e.g. described in 3GPP TS 23.060.

Upon a handover from, a connection using a direct tunnel, e.g. from an RWC to a BSC (or another RNC) as discussed above, through reset and replacement of the direct tunnel, it becomes possible to forward packets to and buffer packets in the new SGSN (which would otherwise not be possible if a direct tunnel was used). Generally the invention concerns forwarding in SGSN (old or first if there is a change of SGSN:s) if a direct tunnel was used before the handover or RAU or InterSystem Change.

It should be clear that the invention also in other respects is not limited to the explicitly illustrated embodiments, but that it can be varied in a number of ways within the scope of the appended claims.

The invention claimed is:

1. A packet data support node, in a telecommunications network, for handling a handover procedure in a first radio access network using direct tunneling of user plane data between a Gateway GPRS Support Node (GGSN) and the packet data support node, the packet data support node comprising:
a microprocessor coupled with a non-transitory memory storing instructions that, when executed, cause the packet data support node to:
detect an intended or initiated handover of a mobile user station from the first radio access network to a target radio access network node of a second radio access network;
send a message to a first Serving GPRS Support Node (SGSN) in the first radio access network node indicating a relocation is required, wherein the first SGSN forwards the message to a second SGSN in the second radio access network;
cause the second SGSN to send a forward relocation response to the first SGSN, wherein the first SGSN sends an update Packet Data Protocol (PDP) context request to the GGSN;
reset and replace a direct tunnel between the GGSN and a Radio Network Controller (RNC) with a first tunnel between the GGSN and the first SGSN and a second tunnel between the first SGSN and the RNC;
redirect the user plane data in the first radio access network from the GGSN to the RNC via the first tunnel and the second tunnel; and
send the user plane data from the first SGSN to the second SGSN via a third tunnel, wherein the user plane data is then forwarded to the target radio access node.

2. The node according to claim 1 is a Radio Network Controller (RNC) and the message comprises identity information of the packet data support node for user plane traffic communication.

3. The node according to claim 1 is a Radio Network Controller (RNC), and the update PDP context request message includes user plane Tunnel Endpoint Identifier (TEID) and IP address of the node, and the update PDP context request message is sent in a handover preparation phase to the GGSN.

4. The node according to claim 1 is a Radio Network Controller (RNC), and the first SGSN is enabled to, and arranged, to bicast user plane data during a subsequent handover execution phase.

5. The node according to claim 1, arranged to detect a (Packet Switched) (PS) handover from Iu-mode to Gb-mode, from Wideband Code Division Multiplex Access (WCDMA) to Global System Mobile Communications (GSM), or an Inter SGSN Routing Area Updates (ISRAU) or an InterSystem Change (ISC).

6. A method, in a telecommunications network, of handling a handover procedure in a first access network using direct tunneling of user plane data between a Gateway GPRS Support Node (GGSN) and node, the method comprising the steps of:
detecting an intended or initiated handover of a mobile user station from the first radio access network to a target radio access network node of a second radio access network;
sending a message to a first Serving GPRS Support Node (SGSN) in the first radio access network node indicating a relocation is required, wherein the first SGSN forwards the message to a second SGSN in the second radio access network;
causing the second SGSN to send a forward relocation response to the first SGSN, wherein the first SGSN sends an update Packet Data Protocol (PDP) context response to the GGSN;
resetting a direct tunnel between the GGSN and a Radio Network Controller (RNC) with a first tunnel between the GGSN and the first SGSN and a second tunnel between the first SGSN and the node;
redirecting the user plane data in the first radio access network from the GGSN to the first SGSN via the first tunnel; and
sending the user plane data from the first SGSN to the second SGSN via a third tunnel, wherein the user plane data is then forwarded to the target radio access node.

7. The method of claim 6, wherein the message comprises identity information of the node for user plane traffic communication.

8. The method of claim 6, wherein the update PDP context request message includes user plane Tunnel Endpoint Identifier (TEID) and IP address of the node, and the update PDP context request message is sent in a handover preparation phase to the GGSN.

9. The method of claim 1 wherein the node is a Radio Network Controller (RNC) and the first SGSN is enabled, and arranged, to bicast user plane data during a subsequent handover execution phase.

10. The method according to claim 6, wherein the handover comprises an Inter-Radio Access Type (IRAT) arranged to detect a Packet Switched handover from Iu-mode to Gb-mode, from Wideband Code Division Multplex Access to Global System Mobile Communications, or an Inter SGSN Routing Area Updates or an InterSystem Change.

* * * * *

UNITED STATES PATENT AND TRADEMARK OFFICE
CERTIFICATE OF CORRECTION

PATENT NO. : 8,300,602 B2  
APPLICATION NO. : 12/520467  
DATED : October 30, 2012  
INVENTOR(S) : Ramle et al.

Page 1 of 1

It is certified that error appears in the above-identified patent and that said Letters Patent is hereby corrected as shown below:

On the Title Page, in item (57), under "ABSTRACT", in Column 2, Line 15, delete "tunnel tunnels" and insert -- tunnels --, therefor.

In Column 1, Line 53, delete "arc a so" and insert -- a so --, therefor.

In Column 5, Line 58, delete "Multiplex" and insert -- Multiple --, therefor.

In Column 11, Line 50, in Claim 5, delete "lu-mode" and insert -- Iu-mode --, therefor.

In Column 11, Line 51, in Claim 5, delete "Multiplex" and insert -- Multiple --, therefor.

In Column 12, Line 46, in Claim 10, delete "lu-mode" and insert -- Iu-mode --, therefor.

In Column 12, Line 47, in Claim 10, delete "Multiplex" and insert -- Multiple --, therefor.

Signed and Sealed this  
Nineteenth Day of February, 2013

Teresa Stanek Rea  
*Acting Director of the United States Patent and Trademark Office*